United States Patent
Xue et al.

(10) Patent No.: US 9,961,173 B2
(45) Date of Patent: May 1, 2018

(54) ANTENNA AND MOBILE TERMINAL INCLUDING THE SAME

(71) Applicant: Beijing Xiaomi Mobile Software Co., Ltd., Haidian District, Beijing (CN)

(72) Inventors: Zonglin Xue, Beijing (CN); Linchuan Wang, Beijing (CN); Xiaofeng Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days. days.

(21) Appl. No.: 15/411,705

(22) Filed: Jan. 20, 2017

(65) Prior Publication Data

US 2017/0272557 A1 Sep. 21, 2017

(30) Foreign Application Priority Data

Mar. 16, 2016 (CN) .......................... 2016 1 0151308

(51) Int. Cl.
| | | |
|---|---|---|
| *H04M 1/02* | (2006.01) | |
| *H04M 1/725* | (2006.01) | |
| *H01Q 1/24* | (2006.01) | |
| *H01Q 5/371* | (2015.01) | |
| *H01Q 5/385* | (2015.01) | |

(52) U.S. Cl.
CPC ............ *H04M 1/026* (2013.01); *H01Q 1/243* (2013.01); *H01Q 5/371* (2015.01); *H01Q 5/385* (2015.01); *H04M 1/725* (2013.01)

(58) Field of Classification Search
CPC ............................... H01Q 1/243; H01Q 5/385
USPC .............. 455/66.1, 550.1, 63.4, 575.5, 575.7
See application file for complete search history.

(56) References Cited

U.S. PATENT DOCUMENTS

| | | | |
|---|---|---|---|
| 7,701,401 B2 | 4/2010 | Suzuki et al. | |
| 9,666,945 B2 * | 5/2017 | Kwak | H01Q 9/0421 |
| 2009/0009401 A1 | 1/2009 | Suzuki et al. | |
| 2011/0122042 A1* | 5/2011 | Huang | H01Q 1/243 |
| | | | 343/860 |

(Continued)

FOREIGN PATENT DOCUMENTS

| | | |
|---|---|---|
| CN | 102800931 A | 11/2012 |
| CN | 103296385 A | 9/2013 |
| CN | 104577334 A | 4/2015 |

OTHER PUBLICATIONS

International Search Report (including English translation) and Written Opinion issued in corresponding International Application No. PCT/CN2016/101188, dated Jan. 4, 2017, 13 pages.

(Continued)

*Primary Examiner* — John J Lee

(57) ABSTRACT

An antenna and a mobile terminal are provided. The antenna may include a radiation unit and at least one parasitic unit. The radiation unit includes a first radiation sub-unit and a second radiation sub-unit. A first terminal of the first radiation sub-unit is connected to a bottom edge of a rear cover of the mobile terminal. A second terminal of the first radiation sub-unit is provided with a feed point, a first terminal of the second radiation sub-unit is connected to the bottom edge. A second terminal of the second radiation sub-unit is provided with a ground point. A distance from the feed point to the ground point is greater than zero and less than a preset value. The at least one parasitic unit is coupleable with the radiation unit via the feed point.

10 Claims, 6 Drawing Sheets

(56) References Cited

U.S. PATENT DOCUMENTS

2015/0070239 A1    3/2015  Hung et al.
2015/0155616 A1*   6/2015  Lin ..................... H01Q 1/243
                                                        343/702

OTHER PUBLICATIONS

Extended European Search Report issued in corresponding EP Application No. 16202720, dated Jul. 20, 2017, 7 pages.

* cited by examiner

ANTENNA AND MOBILE TERMINAL INCLUDING THE SAME

CROSS REFERENCE TO RELATED APPLICATION

This application is based upon and claims priority to Chinese Patent Application Serial No. 201610151308.5, filed with the State Intellectual Property Office of P. R. China on Mar. 16, 2016, the entire contents of which are incorporated herein by reference.

TECHNICAL FIELD

The present disclosure relates to communication field, and more particularly, to an antenna and a mobile terminal including the same.

BACKGROUND

With the rapid development and application of mobile communication technology, an antenna on a mobile terminal has been vigorously promoted along directions of miniaturization, multi-band, multi-polarization, and multi-purpose.

The antenna includes a radiation unit. Frequency bands generated by the antenna are determined by factors such as a shape, size, length, material and the like of the radiation unit. At present, the antenna of the mobile terminal includes only one radiation unit. This radiation unit is connected to a bottom edge of a rear cover of the mobile terminal. This antenna of the mobile terminal is usually able to achieve low frequency bands.

SUMMARY

In order to overcome the problems in the related art, the present disclosure provides an antenna of a mobile terminal and a mobile terminal. The technical solutions may be as follows.

According to a first aspect of the present disclosure, an antenna of a mobile terminal is provided. The antenna includes a radiation unit and at least one parasitic unit. The radiation unit includes a first radiation sub-unit and a second radiation sub-unit. A first terminal of the first radiation sub-unit is connected to a bottom edge of a rear cover of the mobile terminal. A second terminal of the first radiation sub-unit is provided with a feed point, a first terminal of the second radiation sub-unit is connected to the bottom edge. A second terminal of the second radiation sub-unit is provided with a ground point, and a distance from the feed point to the ground point is greater than zero and less than a preset value. The at least one parasitic unit is coupleable with the radiation unit via the feed point.

According to a second aspect of embodiments of the present disclosure, a mobile terminal is provided. The mobile terminal includes a printed circuit board and the above antenna of the mobile terminal, in which the antenna of the mobile terminal is placed in a clearance area of the printed circuit board.

It is to be understood that both the foregoing general description and the following detailed description are exemplary and explanatory only and are not restrictive of the present disclosure.

BRIEF DESCRIPTION OF THE DRAWINGS

Accompanying drawings herein are incorporated in and constitute a part of the specification, and illustrate exemplary embodiments in line with the present disclosure, and serve to explain the principle of the present disclosure together with the description.

By the above accompanying drawings, the specific embodiments of the present disclosure have been shown, which will be descripted more detailed in the following. The accompanying drawings and text descriptions are not to limit the scope of ideas of the present disclosure anyway, but to explain the concept of the present disclosure for those skilled in the related art with reference to specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It will be appreciated that the present disclosure is not limited to the exact construction that has been described and illustrated in the accompanying drawings, and that various modifications and changes can be made without departing form the scope thereof. It is intended that the scope of the disclosure only be limited by the appended claims. Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The present disclosure provides an antenna of a mobile terminal and a mobile terminal. By arranging a structure of a radiation unit, a structure of at least one parasitic unit, and a relative position between the radiation unit and the at least one parasitic unit, the antenna of the mobile terminal may produce the frequency band with the wider range. For example, the radiation unit may generate RF signals with a frequency in the range of 700 MHz to 960 MHz. The at least one parasitic unit and the radiation unit may work together to generate RF signals with a frequency in the ranges of 1710 MHz to 2170 MHz, 2300 MHz to 2400 MHz, and 2500 MHz to 2700 MHz.

Figure 1:
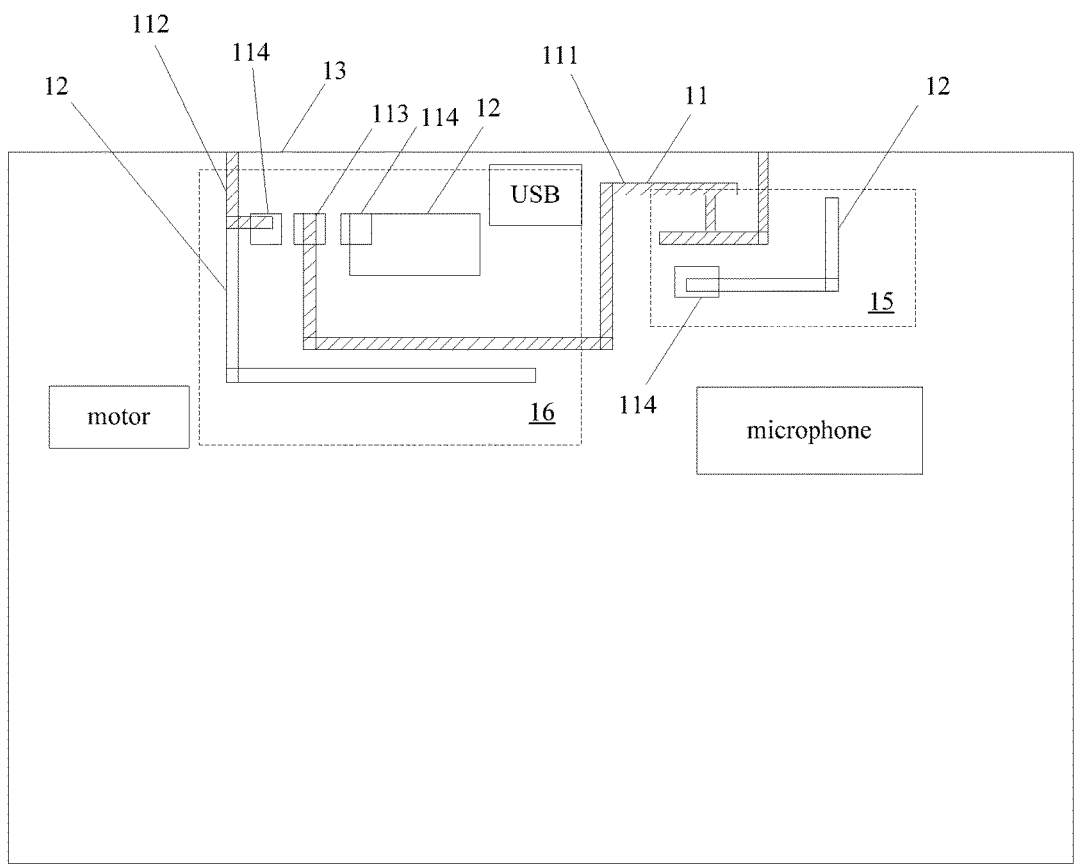
FIG. 1 is a schematic diagram illustrating an antenna of a mobile terminal according to an exemplary embodiment of the present disclosure.

FIG. 1 is a schematic diagram illustrating an antenna of a mobile terminal according to an exemplary embodiment of the present disclosure. As shown in FIG. 1, the antenna of the mobile terminal includes a radiation unit 11 (which the shaded structures in drawings) and at least one parasitic unit 12. Here, the parasitic unit 12 may include one or more branches extended from the ground point 114. The shape of the branches and their proximities to the radiation unit 11 are configured such that at least a portion of the radiation energy may be transferred to the parasitic unit 12 via coupling between the radiation unit 11 and the parasitic unit 12. The radiation unit 11 includes a first radiation sub-unit 111 and a second radiation sub-unit 112. A first terminal of the first radiation sub-unit 111 is connected to a bottom edge 13 of a rear cover of the mobile terminal, and a second terminal of the first radiation sub-unit 111 is provided with a feed point 113. A first terminal of the second radiation sub-unit 112 is connected to the bottom edge 13, and a second terminal of the second radiation sub-unit 112 is provided with a ground point 114.

Here, the mobile terminal may further include a matching circuit that includes a tuner and a switch to control the radiation impedance value of the whole antenna. The tuner and switch may further be configured to change current allocation to the radiation unit 11 so that the parasitic unit 12 have an adjustable energy distribution. Therefore, the mobile terminal may tune the frequency range of the RF signals from the parasitic unit 12 by controlling the tuner and switch to tune the energy distribution.

Figure 6:
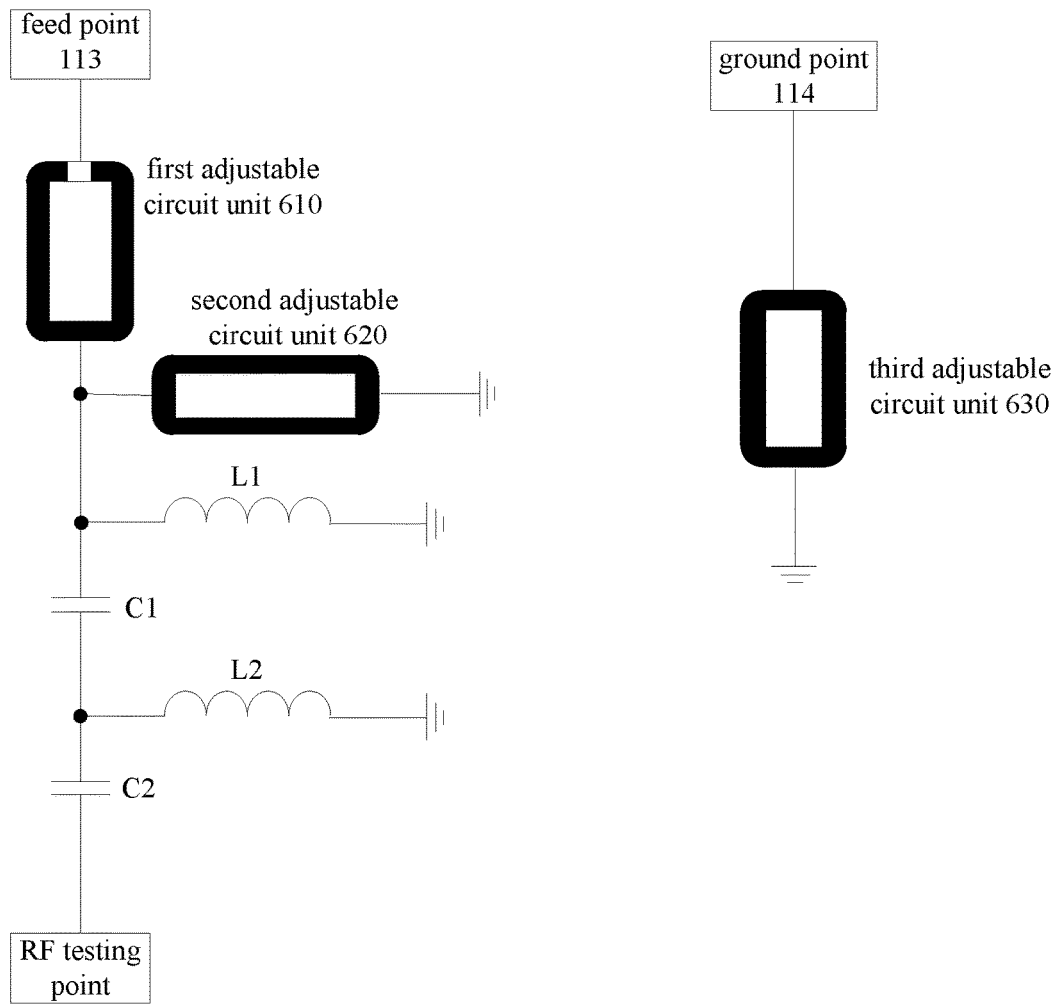
FIG. 6 shows example matching circuit according to one or more embodiments of the instant disclosure.

FIG. 6 shows example matching circuit 600 according to one or more embodiments of the instant disclosure. In the matching circuit 600, the feed point 113 may be connected to one or more adjustable circuit units, which may include a tuner, a switch, etc. In FIG. 6, the matching circuit 600 includes a first adjustable circuit unit 610 connected to the feed point 113, a second adjustable circuit unit 620 connected between the first adjustable circuit unit 610 and the ground. The matching circuit 600 further includes a plurality of capacitors C1, C2, and a plurality of inductors L1, L2. The capacitor C2 is connected to the RF testing point, which may be the power input to the antenna. A third adjustable circuit unit 630 may be connected between the ground point 114 and the ground.

Figure 7:
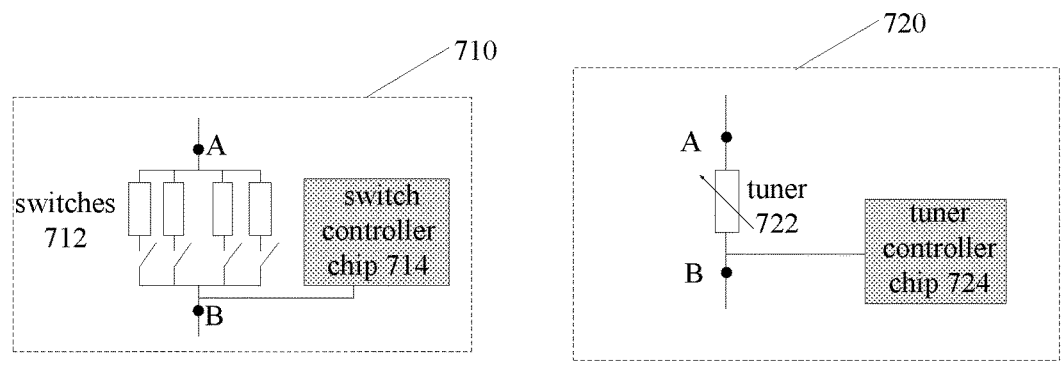
FIG. 7 shows examples of the adjustable circuit units.

FIG. 7 shows examples of the adjustable circuit units. On the left side of FIG. 7, the adjustable circuit unit 710 includes a plurality of switches 712 and a switch controller chip 714. On the right side of FIG. 7, the adjustable circuit unit 720 includes a tuner 722 and a tuner controller chip 724. Note that the adjustable circuit unit may include additional circuit units if needed.

A distance from the feed point 113 to the ground point 114 is greater than zero and less than a preset value. The preset value may be set according to actual needs and may be set to be less than about 4 mm, more preferably less than 3 mm. For example, the preset value may be set to be 2 mm. The first radiation sub-unit 111 and the second radiation sub-unit 112 constitute a structure similar to a ring. The at least one parasitic unit 12 is coupleable with the radiation unit 11 via the feed point.

In one or more embodiments, the at least one parasitic unit 12 may be coupled with the radiation unit 11 via the feed point. For example, the parasitic unit 12 may be disposed with a preset distance to the radiation unit 11 so that a desired portion of energy is coupled to the parasitic unit 12.

It should be noted that, in embodiments of the present disclosure, a shape, size, length and material of the radiation unit 11 and a shape, size, length, material and the number of the parasitic unit 12 may be set according to actual needs. For example, the radiation unit 11 may include material such as: metal, semiconducting material, metamaterial, etc. The parasitic unit 12 may be rectangle, circle, trapezoid, and the like, and the present disclosure is not limited thereto.

Further, the relative position between the radiation unit 11 and the parasitic unit 12 may be set according to actual needs. FIG. 1 only shows one condition. As show in FIG. 1, the antenna of the mobile terminal includes three parasitic units 12. One of the three parasitic units 12 is placed in a first area 15, and the other two of the three parasitic units 12 are placed in a second area 16. The two examples of the first area 15 and the second area 16 are denoted by dashed rectangular boxes. However, the shape and area of the two areas are not limited by the examples shown here. The first area is between the first radiation sub-unit 111 and the second radiation sub-unit 112, and the second area is outside the first radiation sub-unit 111 and the second radiation sub-unit 112. In drawings, the parasitic unit 12 located in the first area is L-shape, and the parasitic unit 12 located in the second area is rectangle.

The present disclosure provides an antenna of the mobile terminal and the mobile terminal. The antenna arranges the structure of the radiation unit to be similar to a ring, the structure of the at least one parasitic unit, and the relative position between the radiation unit and the at least one parasitic unit. Thus, the antenna of the mobile terminal may produce the frequency band with a wider range.

Figure 2:
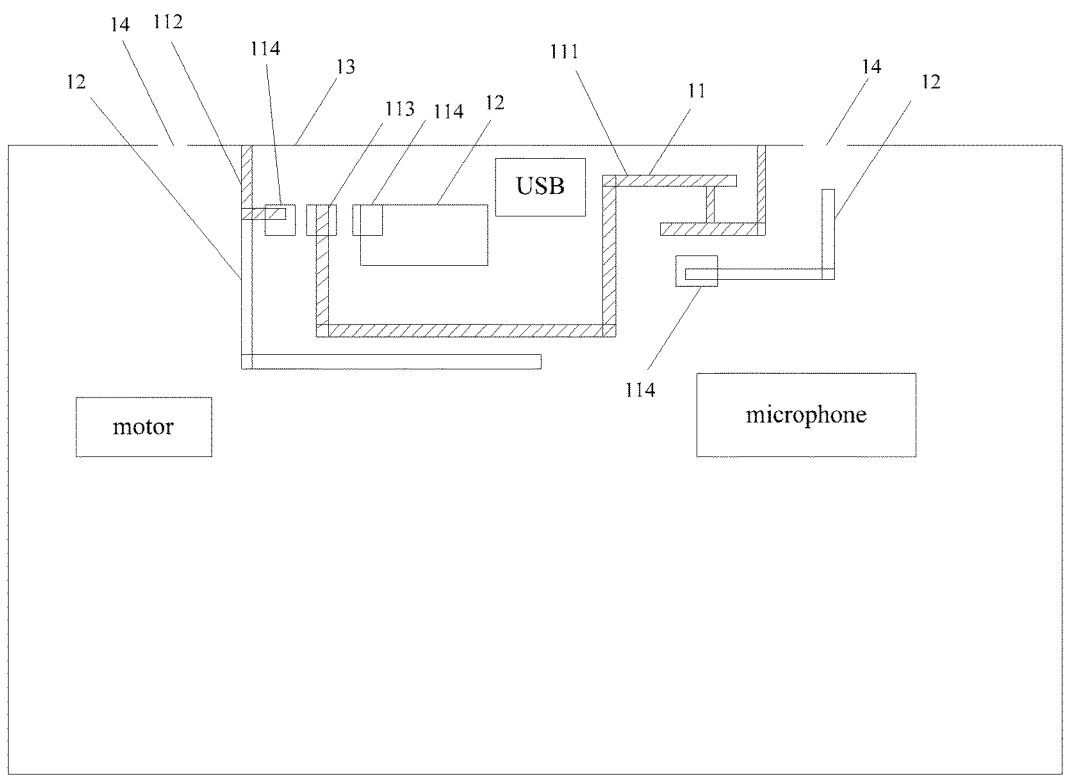
FIG. 2 is a schematic diagram illustrating an antenna of a mobile terminal according to another exemplary embodiment of the present disclosure.

FIG. 2 is a schematic diagram illustrating an antenna of a mobile terminal according to another exemplary embodiment of the present disclosure. As shown in FIG. 2, based on the above embodiment, further, two slits 14 are provided in the bottom edge 13 in the antenna of the mobile terminal, the first terminal of the first radiation sub-unit 111 is connected to a part of the bottom edge between the two slits 14, and the first terminal of the second radiation sub-unit 112 is connected to the part of the bottom edge between the two slits 14. A distance between the parasitic unit 12 and the slit 14 is greater than zero. Each parasitic unit 12 is provided with a ground point 114.

It should be noted that, a width of the slit 14 may be set according to actual needs, and the distance between the slit 14 and the parasitic unit 12 may also be set according to actual needs.

In embodiments of the present disclosure, since two slits are placed in the bottom edge, such that the radiation unit is connected to the part of the bottom edge between the two slits, which makes energy loss of the antenna through a user's hand or head is not too much when the user hands the mobile terminal or takes a call through the mobile terminal, thereby lowering interference of the head and hand to the antenna and improving influence of the head and hand.

Figure 3:
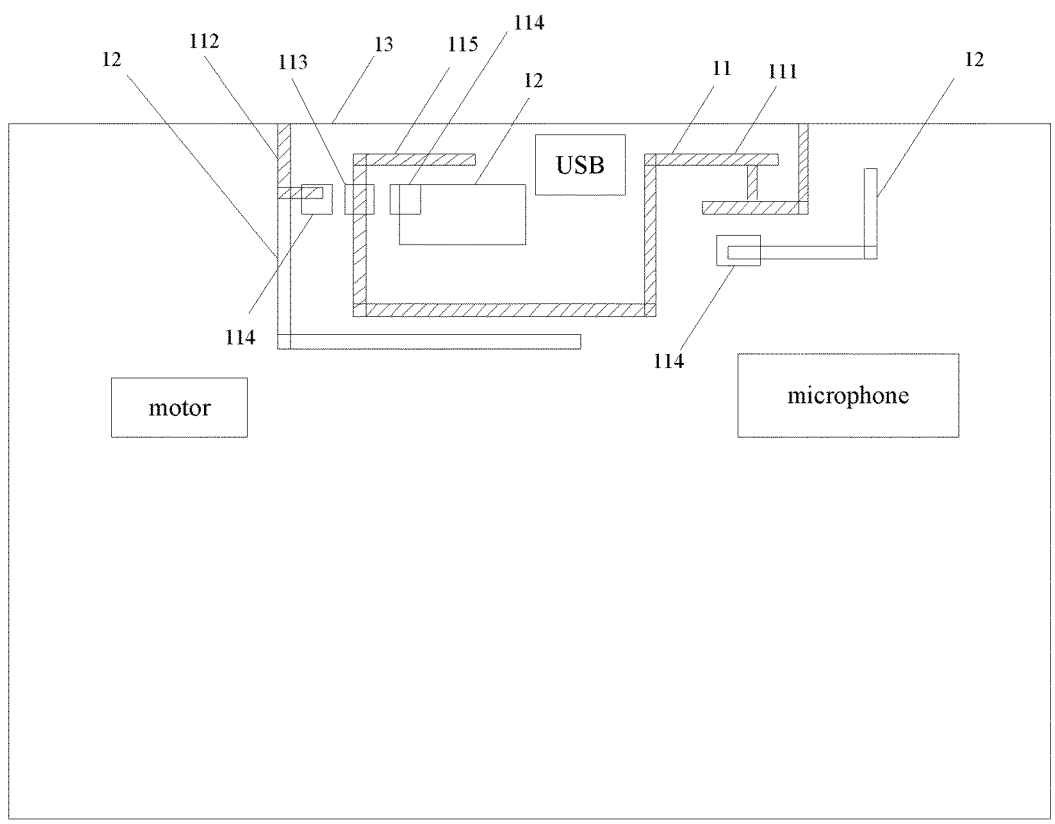
FIG. 3 is a schematic diagram illustrating an antenna of a mobile terminal according to still another exemplary embodiment of the present disclosure.

Based on the antenna shown in FIG. 1, further, embodiments of the present disclosure also provide an antenna of a mobile terminal. FIG. 3 is a schematic diagram illustrating an antenna of a mobile terminal according to still another exemplary embodiment of the present disclosure. As shown in FIG. 3, the antenna of the mobile terminal includes a radiation unit 11 (which is represented by "///" in drawings) and at least one parasitic unit 12. The radiation unit 11 includes a first radiation sub-unit 111, a second radiation sub-unit 112 and a third radiation sub-unit 115. A first terminal of the first radiation sub-unit 111 is connected to a bottom edge 13 of a rear cover of the mobile terminal, and a second terminal of the first radiation sub-unit 111 is provided with a feed point 113. A first terminal of the second radiation sub-unit 112 is connected to the bottom edge 13, and a second terminal of the second radiation sub-unit 112 is provided with a ground point 114. A distance from the feed point 113 to the ground point 114 is greater than zero and less than a preset value. The preset value may be set according to actual needs and may be set to 2 mm. The first radiation sub-unit 111 and the second radiation sub-unit 112 constitute a structure similar to a ring. The third radiation sub-unit 115 is connected to the first radiation sub-unit 111 at the feed point 113. The at least one parasitic unit 12 is coupleable with the radiation unit 11 via the feed point.

In embodiments of the present disclosure, by arranging the third radiation sub-unit, the antenna of the mobile terminal may generate the frequency band with a wider range compared to the antenna shown in FIG. 1.

Figure 4:
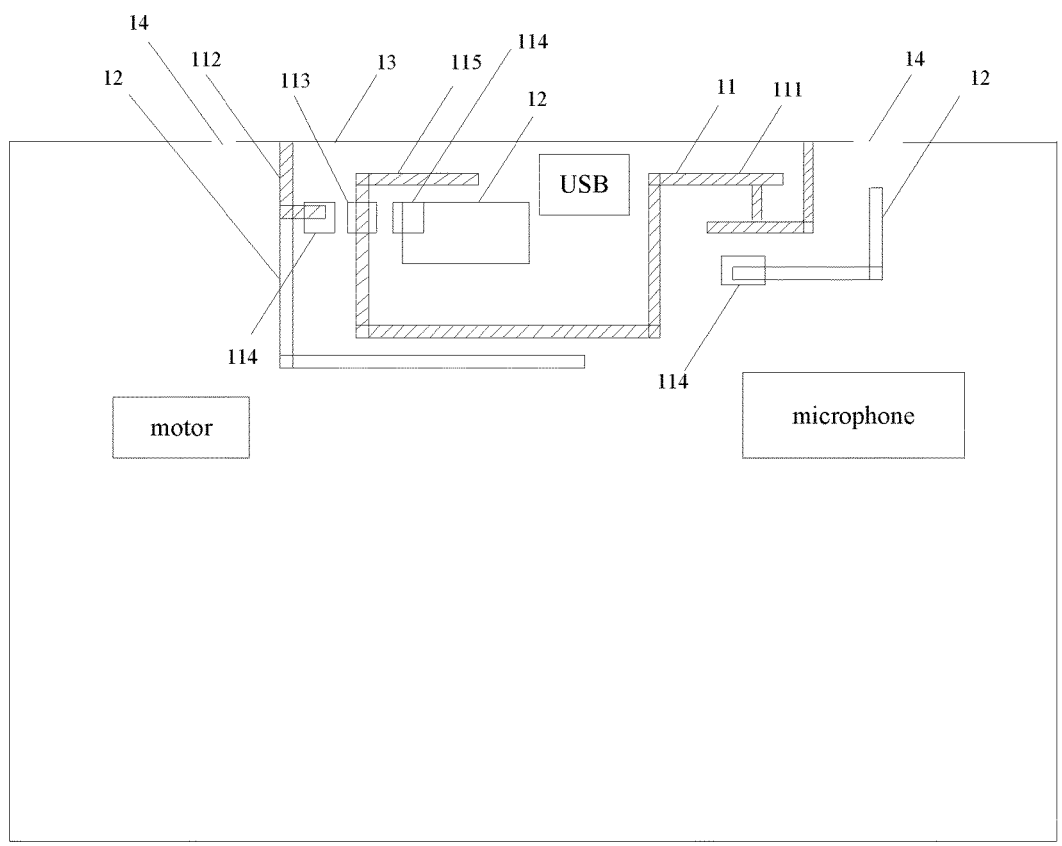
FIG. 4 is a schematic diagram illustrating an antenna of a mobile terminal according to yet still another exemplary embodiment of the present disclosure.

Based on the antenna shown in FIG. 3, embodiments of the present disclosure further provide an antenna of a mobile terminal. For example, FIG. 4 is a schematic diagram illustrating an antenna of a mobile terminal according to yet still another exemplary embodiment of the present disclosure. As shown in FIG. 4, further in the antenna of the mobile terminal, two slits 14 are provided in the bottom edge 13, the first terminal of the first radiation sub-unit 111 is connected to a part of the bottom edge between the two slits 14, and the first terminal of the second radiation sub-unit 112 is connected to the part of the bottom edge between the two slits 14. A distance between the parasitic unit 12 and the slit 14 is greater than zero. Each parasitic unit 12 is provided with a ground point 114.

In embodiments of the present disclosure, since two slits are placed in the bottom edge, and the radiation unit is connected to the part of the bottom edge between the two slits, energy loss of the antenna through a user's hand or head is not too much when the user hands the mobile terminal or takes a call through the mobile terminal, thereby lowering interference of the head and hand to the antenna and improving influence of the head and hand. Further, since the third radiation sub-unit is arranged, the antenna of the mobile terminal may generate the frequency band with the range of 700-2700 MHz.

Embodiments of the present disclosure also provide a mobile terminal. The mobile terminal includes the above antenna of the mobile terminal and a printed circuit board (PCB for short). The antenna of the mobile terminal includes a radiation unit and at least one parasitic unit. The radiation unit includes a first radiation sub-unit and a second radiation sub-unit. A first terminal of the first radiation sub-unit is connected to a bottom edge of a rear cover of the mobile terminal, and a second terminal of the first radiation sub-unit is provided with a feed point. A first terminal of the second radiation sub-unit is connected to the bottom edge, and a second terminal of the second radiation sub-unit is provided with a ground point. A distance from the feed point to the ground point is greater than zero and less than a preset value. The at least one parasitic unit is coupleable with the radiation unit via the feed point. The antenna of the mobile terminal is placed in a clearance area of the PCB. The clearance area of the PCB is an area without other components such as a Universal Serial Bus (USB for short), a motor, a microphone and the like.

In embodiments of the present disclosure, the antenna of the mobile terminal is placed in the clearance area of the PCB, so as to reduce influence of components such as the USB, the motor, the microphone and the like to the antenna.

Alternatively or additionally, the antenna of the mobile terminal further includes a third radiation sub-unit. The third radiation sub-unit is connected to the first radiation sub-unit at the feed point. The at least one parasitic unit is coupleable with the radiation unit via the feed point.

Alternatively or additionally, in the antenna of the mobile terminal, two slits are provided in the bottom edge, the first terminal of the first radiation sub-unit is connected to a part of the bottom edge between the two slits, and the first terminal of the second radiation sub-unit is connected to the part of the bottom edge between the two slits. A distance between the parasitic unit and the slit is greater than zero.

Figure 5:
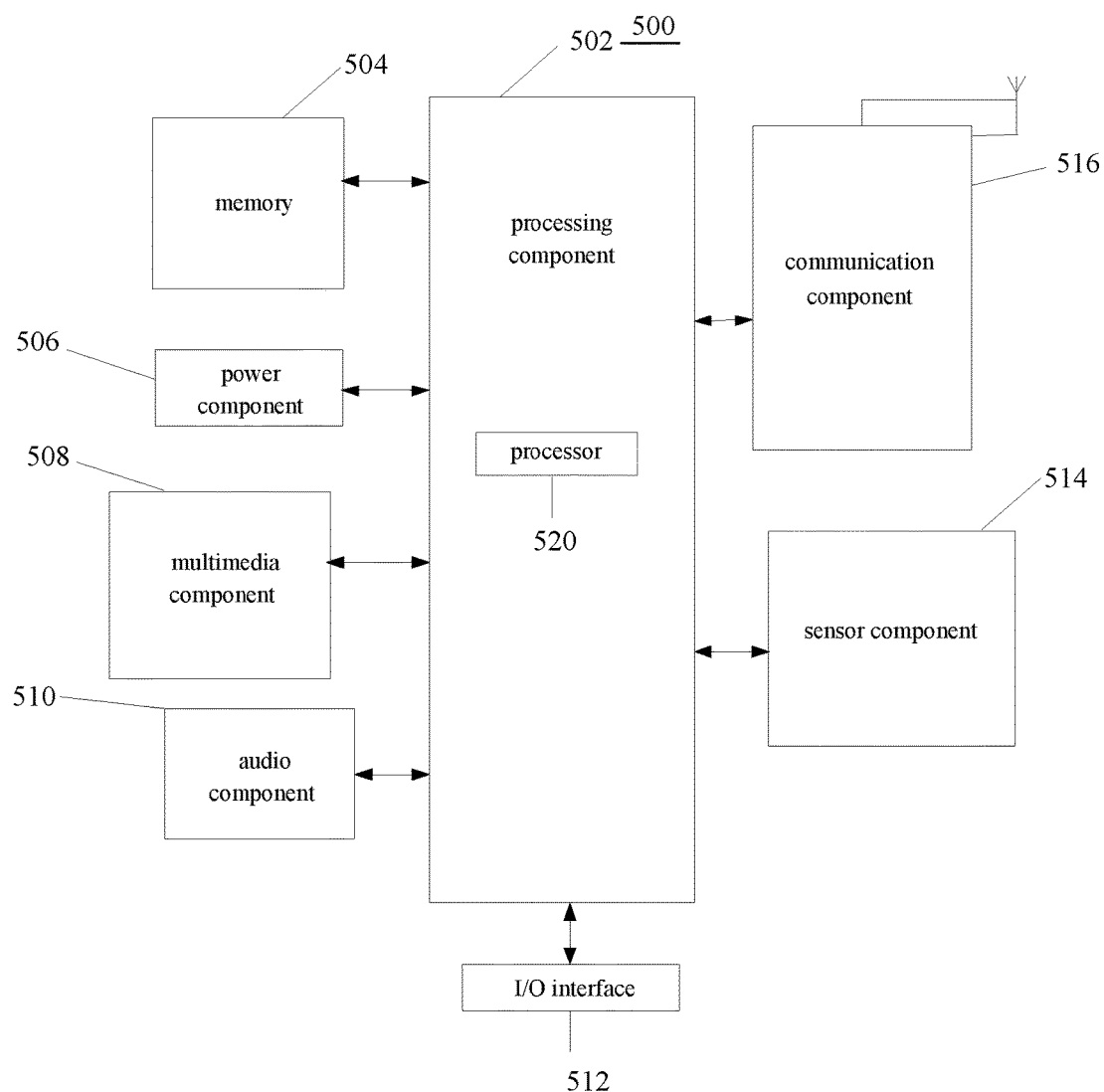
FIG. 5 is a block diagram illustrating a mobile terminal 500 including the antenna according to an exemplary embodiment of the present disclosure.

FIG. 5 is a block diagram illustrating a mobile terminal 500 including the antenna according to an exemplary embodiment of the present disclosure. Referring to FIG. 5, the mobile terminal 500 may include the following one or more components: a processing component 502, a memory 504, a power component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the mobile terminal 500. Examples of such data include instructions for any applications or methods operated on the mobile terminal 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the mobile terminal 500. The power component 506 may include a power management system, one or more power sources, and any other components associated with the generation, management, and distribution of power in the mobile terminal 500.

The multimedia component 508 includes a screen providing an output interface between the mobile terminal 500 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 508 includes a front camera and/or a rear camera. The front camera and/or the rear camera may receive external multimedia data while the mobile terminal 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the mobile terminal 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface for the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the mobile terminal 500. For instance, the sensor component 514 may detect an open/closed status of the mobile terminal 500 and relative positioning of components (e.g. the display and the keypad of the mobile terminal 500). The sensor component 514 may also detect a change in position of the mobile terminal 500 or of a component in the mobile terminal 500, a presence or absence of user contact with the mobile terminal 500, an orientation or an acceleration/deceleration of the mobile terminal 500, and a change in temperature of the mobile terminal 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate wired or wireless communication between the mobile terminal 500 and other devices. The mobile terminal 500 can access a wireless network based on a communication standard, such as WIFI, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the mobile terminal 500 may be implemented with one or more circuitries, which include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The mobile terminal 500 may use the circuitries in combination with the other hardware or software components for performing the above described methods. Each module, sub-module, unit, or sub-unit disclosed above may be implemented at least partially using the one or more circuitries.

In exemplary embodiments, there is also provided a non-transitory computer readable storage medium including instructions, such as the memory 504 including instructions. For example, the non-transitory computer-readable storage medium may be a ROM, a RAM, a CD-ROM, a magnetic tape, a floppy disc, an optical data storage device, and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:
1. An antenna of a mobile terminal, comprising:
    a radiation unit comprising a first radiation sub-unit and a second radiation sub-unit, wherein a first terminal of the first radiation sub-unit is connected to a bottom edge of a rear cover of the mobile terminal, a second terminal of the first radiation sub-unit is provided with a feed point, a first terminal of the second radiation sub-unit is connected to the bottom edge, a second terminal of the second radiation sub-unit is provided with a ground point, and a distance from the feed point to the ground point is greater than zero and less than a preset value;

at least one parasitic unit that is coupleable with the radiation unit via the feed point; and a third radiation sub-unit, where the third radiation sub-unit is connected with the first radiation sub-unit at the feed point.

2. The antenna according to claim 1, wherein the at least one parasitic unit comprises three parasitic units, a distance between adjacent parasitic units is greater than zero;

one of the three parasitic units is placed in a first area, the other two of the three parasitic units are placed in a second area; and the first area is between the first radiation sub-unit and the second radiation sub-unit, and the second area is outside the first radiation sub-unit and the second radiation sub-unit.

3. The antenna according to claim 1, wherein two slits are provided in the bottom edge, the first terminal of the first radiation sub-unit is connected to a part of the bottom edge between the two slits, and the first terminal of the second radiation sub-unit is connected to the part of the bottom edge between the two slits.

4. The antenna according to claim 3, wherein a distance between the parasitic unit and the slit is greater than zero.

5. The antenna according to claim 1, wherein each parasitic unit is provided with a ground point.

6. A mobile terminal, comprising:
a printed circuit board; and
an antenna that is disposed in a clearance area of the printed circuit board,
wherein the antenna of the mobile terminal comprises a radiation unit, at least one parasitic unit and a third radiation sub-unit;

wherein the radiation unit comprises a first radiation sub-unit and a second radiation sub-unit, a first terminal of the first radiation sub-unit is connected to a bottom edge of a rear cover of the mobile terminal, a second terminal of the first radiation sub-unit is provided with a feed point, a first terminal of the second radiation sub-unit is connected to the bottom edge, a second terminal of the second radiation sub-unit is provided with a ground point, and a distance from the feed point to the ground point is greater than zero and less than a preset value;

wherein the at least one parasitic unit is coupleable with the radiation unit via the feed point; and wherein the third radiation sub-unit is connected with the first radiation sub-unit at the feed point.

7. The mobile terminal according to claim 6, wherein the at least one parasitic unit comprises three parasitic units, a distance between adjacent parasitic units is greater than zero;

one of the three parasitic units is placed in a first area, the other two of the three parasitic units are placed in a second area;

the first area is between the first radiation sub-unit and the second radiation sub-unit, and the second area is outside the first radiation sub-unit and the second radiation sub-unit.

8. The mobile terminal according to claim 6, wherein two slits are provided in the bottom edge, the first terminal of the first radiation sub-unit is connected to a part of the bottom edge between the two slits, and the first terminal of the second radiation sub-unit is connected to the part of the bottom edge between the two slits.

9. The mobile terminal according to claim 8, wherein a distance between the parasitic unit and the slit is greater than zero.

10. The mobile terminal according to claim 6, wherein each parasitic unit is provided with a ground point.

* * * * *